United States Patent
Pausch et al.

[11] Patent Number: 5,993,691
[45] Date of Patent: Nov. 30, 1999

[54] ELECTRO-OPTICAL LIQUID CRYSTAL DISPLAY

[75] Inventors: Axel Pausch, Seeheim; Eike Poetsch, Mühltal; Kazuaki Tarumi, Seeheim; Anja Huth, Riedstadt; Andreas Wächtler, Tübingen; Andreas Beyer, Hanau; Brigitte Schuler, Grossostheim; Volker Reiffenrath, Rossdorf; Matthias Bremer, Darmstadt; Michael Kompter, Riedstadt, all of Germany

[73] Assignee: Merck Patent Gesellschaft MIT, Darmstadt, Germany

[21] Appl. No.: 08/875,745

[22] PCT Filed: Jan. 22, 1996

[86] PCT No.: PCT/EP96/00239

§ 371 Date: Aug. 4, 1997

§ 102(e) Date: Aug. 4, 1997

[87] PCT Pub. No.: WO96/23851

PCT Pub. Date: Aug. 8, 1996

[30] Foreign Application Priority Data

| Feb. 3, 1995 | [DE] | Germany | 195 03 507 |
| Mar. 17, 1995 | [DE] | Germany | 195 09 791 |
| Aug. 1, 1995 | [DE] | Germany | 195 28 104 |
| Aug. 1, 1995 | [DE] | Germany | 195 28 106 |
| Aug. 1, 1995 | [DE] | Germany | 195 28 107 |
| Oct. 11, 1995 | [DE] | Germany | 195 37 802 |

[51] Int. Cl.[6] .......... C09K 19/30; C09K 19/12; C09K 19/20; G02F 1/1337
[52] U.S. Cl. .............. 252/299.63; 252/299.66; 252/299.67; 252/299.61; 349/123; 349/182
[58] Field of Search .......... 252/299.63, 299.67, 252/299.61, 299.66; 349/182, 123

[56] References Cited

U.S. PATENT DOCUMENTS

| 5,463,482 | 10/1995 | Jones .......... 359/51 |
| 5,519,525 | 5/1996 | Weber et al. .......... 359/103 X |
| 5,578,241 | 11/1996 | Plach et al. .......... 252/299.01 |
| 5,618,466 | 4/1997 | Tomi et al. .......... 252/299.63 |
| 5,716,543 | 2/1998 | Schlosser et al. .......... 252/299.63 |
| 5,718,840 | 2/1998 | Plach et al. .......... 252/299.66 |
| 5,725,799 | 3/1998 | Bremer et al. .......... 252/299.67 |
| 5,730,904 | 3/1998 | Bartmann et al. .......... 252/299.63 |
| 5,733,477 | 3/1998 | Kondo et al. .......... 252/299.67 |
| 5,746,941 | 5/1998 | Rieger et al. .......... 252/299.63 |
| 5,762,828 | 6/1998 | Tanaka et al. .......... 252/299.63 |
| 5,779,933 | 7/1998 | Terashima et al. .......... 252/299.01 |
| 5,792,387 | 8/1998 | Hachiya et al. .......... 252/299.6 |

FOREIGN PATENT DOCUMENTS

| 588568 | 3/1994 | European Pat. Off. . |
| 667555 | 2/1995 | European Pat. Off. . |
| 673986 | 3/1995 | European Pat. Off. . |

OTHER PUBLICATIONS

Translation of JP 7–181439, (Jul. 1995).

*Primary Examiner*—C. H. Kelly
*Attorney, Agent, or Firm*—Millen, White, Zelano & Branigan, P.C.

[57] ABSTRACT

The invention relates to an electro-optical liquid-crystal display having a realignment layer for realigning the liquid crystals whose field has a significant component parallel to the liquid-crystal layer and which contains a liquid-crystalline medium of positive dielectric anisotropy, where the medium comprises at least one mesogenic compound containing a 3,4,5-trifluorophenyl group and/or comprises at least one mesogenic compound [lacuna] a structural unit of the formula 2

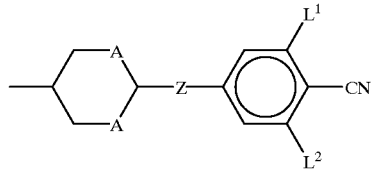

(2)

in which
A is O or CH,
z is —COO— or a single bond
$L^1$ is F or, if A is O, is alternatively H, and
$L^2$ is H or F.

33 Claims, No Drawings

ELECTRO-OPTICAL LIQUID CRYSTAL DISPLAY

The invention relates to an electro-optical liquid-crystal display having a realignment layer for realigning the liquid crystals whose field has a significant component parallel to the liquid-crystal layer and which contains a liquid-crystalline medium of positive dielectric anisotropy, where the medium comprises at least one mesogenic compound containing a 3,4,5-trifluorophenyl group and/or comprises at least one mesogenic compound comprising a structural unit of the formula 2

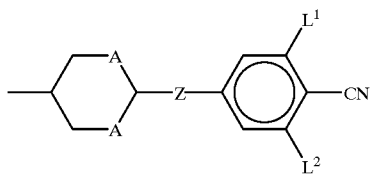

(2)

in which
  A is O or CH,
  Z is —COO— or a single bond
  $L^1$ is F or, if A is O, is alternatively H, and
  $L^2$ is H or F.

In conventional liquid-crystal displays (TN, STN, OMI or AMD-TN), the electric fields for realignment are generated essentially perpendicular to the liquid-crystal layer.

International patent application WO 91/10936 discloses a liquid-crystal display in which the electric signals are generated in such a way that the electric fields haste a significant component parallel to the liquid-crystal layer (IPS, in-plane switching). The principles of operating such a display are described, for example, by R. A. Soref in Journal of Applied Physics, vol. 45, No. 12, pp. 5466–5468 (1974).

EP 0 588 568 discloses various ways of addressing a display of this type.

These IPS displays can be operated with liquid-crystalline materials either of positive or of negative dielectric anisotropy ($\Delta\epsilon \neq 0$). However, using the materials known hitherto, relatively high threshold voltages and long response times are achieved in IPS displays. The object was therefore to indicate liquid-crystalline materials which are suitable for achieving relatively low threshold voltages and short response times in IPS displays.

Surprisingly, this object has been achieved by the use of liquid-crystalline materials comprising at least one compound containing a 3,4,5-trifluorophenyl group and/or comprising at least one mesogenic compound comprising a structural unit of the formula 2

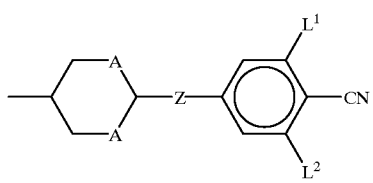

(2)

in which
  A is O or CH,
  Z is —COO— or a single bond
  $L^1$ is F or, if A is O, is alternatively H, and
  $L^2$ is H or F.

Compounds of this type are disclosed, for example, in EP 0 387 032 and WO 91/03450.

However, there is no indication therein that the threshold voltages and the response times of IPS displays can be improved with the aid of these substances.

The invention therefore relates to an electro-optical liquid-crystal display having a realignment layer for realigning the liquid crystals whose field has a significant component parallel to the liquid-crystal layer and which contains a liquid-crystalline medium of positive dielectric anisotropy, where the medium comprises at least one mesogenic compound containing a 3,4,5-trifluorophenyl group and/or comprises at least one mesogenic compound comprising a structural unit of the formula 2

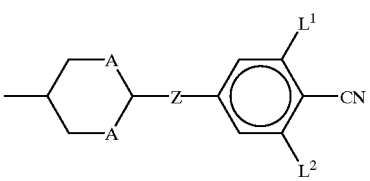

(2)

in which
  A is O or CH,
  Z is —COO— or a single bond
  $L^1$ is F or, if A is O, is alternatively H, and
  $L^2$ is H or F.

Preferred embodiments are IPS displays in which
  a) the medium comprises at least one compound of the formula I;

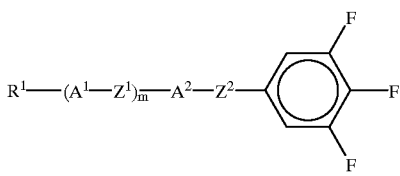

(I)

in which
  R is H, an alkyl or alkenyl radical having 1 to 15 carbon atoms which is unsubstituted, monosubstitued by CN or $CF_3$ or at least monosubstituted by halogen, where one or more $CH_2$ groups in these radicals may also, in each case independently of one another, be replaced by —O—, —S—,

—CO—, —CO—O—, —O—CO— or —O—CO—O— in such a way that O atoms are not linked directly to one another, $A^1$ and $A^2$ are each, independently of one another, a
    (a) trans-1,4-cyclohexylene radical or 1,4-cyclohexenylene radical, in which, in addition, one or more non-adjacent $CH_2$ groups may be replaced by —O— and/or —S—,
    (b) 1,4-phenylene radical, in which, in addition, one or two CH groups may be replaced by N, (c) radical from the group consisting of 1,4-dicyclo(2,2,2)octylene, piperidine-1,4-diyl, naphthalene-2,6-diyl, decahydronaphthalene-2,6-diyl and 1,2,3,4-tetrahydronaphthalene-2,6-diyl, where the radicals (a) and (b) may be substituted by one or two fluorine atoms, $Z^1$ and $Z^2$ are each, independently of one another, —CO—O—, —O—CO—, —CH$_2$O—, —OCH$_2$—, —CH$_2$CH$_2$—, —CH=CH—, —C≡C—, or a single bond, or one of the radicals $Z^1$ and $Z^2$ is —(CH$_2$)$_4$— or —CH=CH—CH$_2$CH$_2$—, and m is 0, 1 or 2;

b) the medium comprises at least one compound containing a group of the formula 3:

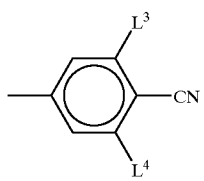
(3)

in which $L^3$ and $L^4$ are each H or F, in particular where the medium comprises at least one compound of the formula II

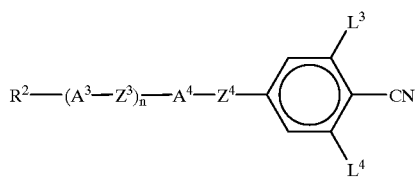
II in which $L^3$ and $L^4$ are as defined above, in particular in which $L^3$ is F and L4 is H or F, $R^2$ is as defined for $R^1$, and $A^3$ and $A^4$ are each, independently, as defined for $A^1$ and $A^2$, $Z^3$ and $Z^4$ are each, independently of one another, as defined for $Z^1$ and $Z^2$, and n is 0, 1 or 2, preferably 0;

c) the medium has a dielectric anisotropy Δε of >8.5, preferably between 8.6 and 14, in particular between 8.7 and 13.5;

d) the medium comprises at least one compound selected from the formulae IIa to IIc

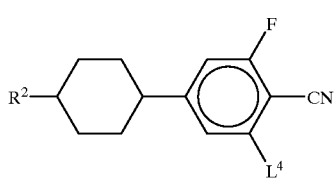
IIa

-continued

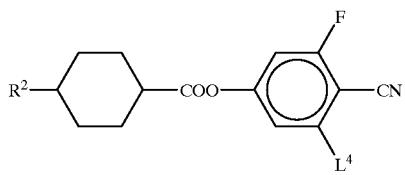
IIb

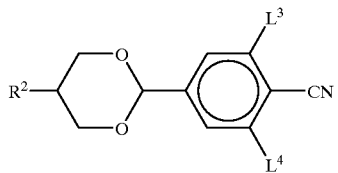
IIc in which $R^2$, $L^3$ and $L^4$ are in each case as defined above;

e) the medium comprises at least one compound of the formula III

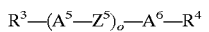
III in which $R^3$ and $R^4$ are each, independently of one another, as defined for $R^1$, $A^5$ and $A^6$ are each, independently of one another, as defined for $A^1$ and $A^2$, $Z^5$ is in each case, independently of the others, as defined for $Z^1$ and $Z^2$, and O is 1, 2 or 3;

f) the medium comprises at least one compound of the formula IV

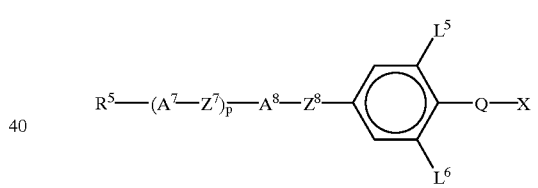
IV in which $R^5$ is as defined for $R^1$, $A^7$ and $A^8$ are each, independently of one another, as defined for $A^1$ and $A^2$, $Z^7$ and $Z^8$ are each, independently of one another, as defined for $Z^1$ and $Z^2$, $L^5$ and $L^6$ are each, independently of one another, H or F.

Q is a polyfluoroalkylene radical of the formula

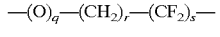

in which q is 0 or 1 r is 0 or an integer between 1 and 6 and s is an integer between 1 and 6,

X is H, F or Cl, and p is 0, 1 or 2.

Preference is furthermore given to an IPS display in which the pixels are addressed by means of an active matrix.

The invention furthermore relates to a liquid-crystalline medium of positive dielectric anisotropy which comprises at least one compound containing a 3,4,5-trifluorophenyl group, preferably a compound of the formula I, and at least one compound containing a group of the formula (3), preferably a group of the formula (2), in particular a compound of the formula II, in particular which comprises

| from 10 to 60% by weight, | preferably from 15 to 40% by weight, of at least one compound of the formula I, |
| from 15 to 40% by weight, | preferably from 20 to 35% by weight, of at least one compound of the formula II, |
| from 20 to 25% by weight, | preferably from 25 to 50% by weight, of at least one compound of the formula (III), and |
| from 0 to 30% by weight, | preferably from 20 to 25% by weight, of a compound of the formula IV. |

The novel liquid-crystalline medium preferably comprises:

at least one compound selected from the formulae Ia and 1b

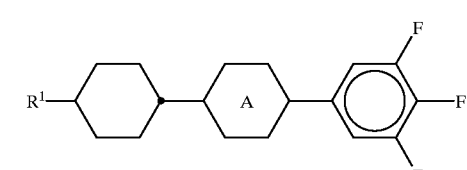
Ia

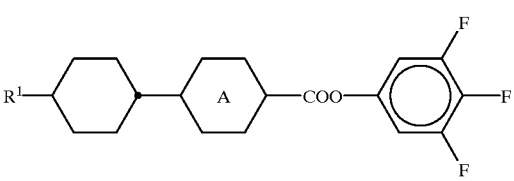
Ib at least one compound selected from the formulae II1, II2, II3 and II4,

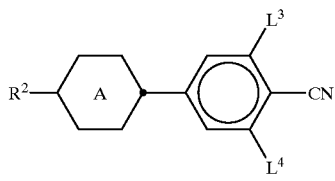
II1

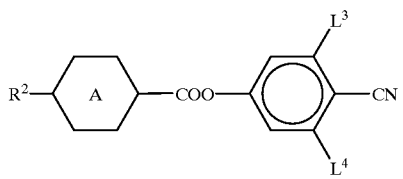
II2

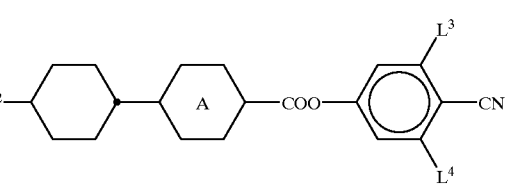
II3

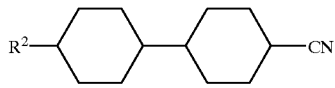
II4 at least one compound selected from the formulae IIIa, IIIb and IIIc,

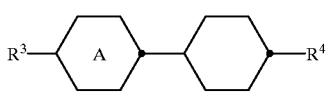
IIIa

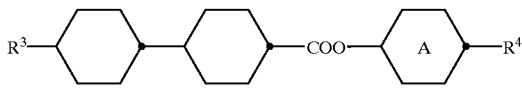
IIIb

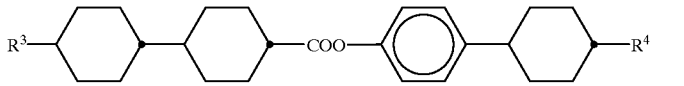
IIIc and
if desired, at least one compound selected from the formulae IVa and IVb,

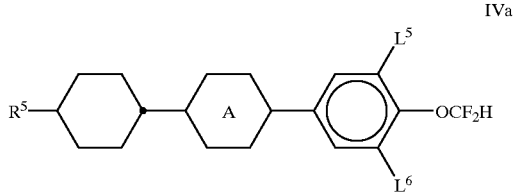
IVa

-continued

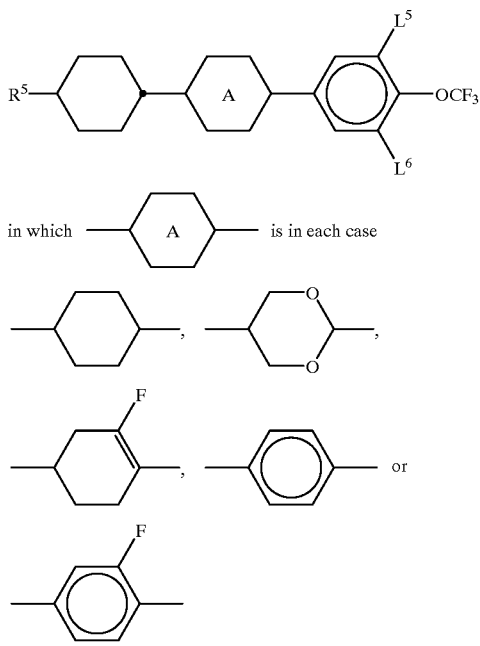

and $R^1, R^2, R^3, R^4, R^5, L^1, L^2, L^3$, and $L^4$ are each as defined above.

In a particularly preferred embodiment, the novel media comprise at least one compound of the formula Ia in which

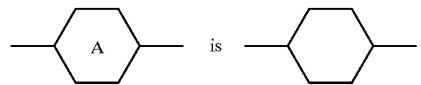

and at least one compound of the formula Ia in which

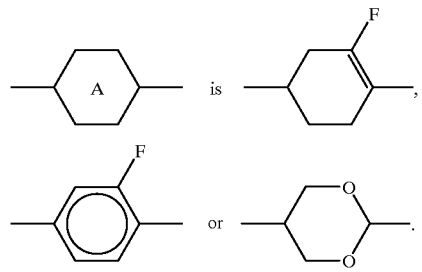

In a further preferred embodiment, the novel media comprise at least one compound of the formula Ia and at least one compound of the formula Ib.

Preference is furthermore given to media comprising at least one compound of the formula IIa in which $L^3$ is F and $L^4$ is H or F and

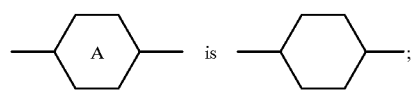

or compounds of the formula IIa, in which $L^3$ and $L^4$ are H or F and

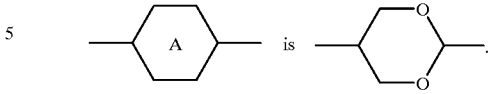

The novel media particularly preferably comprise a compound of the formula IIb in which

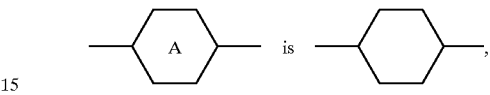

and $L^3$ is F.

The novel liquid-crystalline media generally have a birefringence ($\Delta n$) of <0.12, preferably between 0.07 and 0.1, in particular between 0.08 and 0.09.

The viscosity (at 20° C.) of the novel materials is generally less than 30 mm$^2$ S$^{-1}$, in particular between 15 and 25 mm$^2$ s$^{-1}$. The resistivity of the novel materials at 20° C. is generally between $5 \times 10^{10}$ and $5 \times 10^{13}$ Ω·cm, particularly preferably between $5 \times 10^{11}$ and $5 \times 10^{12}$ Ω·cm.

It has been found that even a relatively small proportion of compounds of the formula I in a mixture with conventional liquid-crystal materials, but in particular with one or more compounds of the formula II, III and/or IV, results in a significant lowering of the threshold voltage and in fast response times, with at the same time broad nematic phases having low smectic-nematic transition temperatures being observed. The compounds of the formulae I to IV are colorless, stable and readily miscible with one another and other liquid-crystal materials.

The term "alkyl" covers straight-chain and branched alkyl groups having 1–7 carbon atoms, in particular the straight-chain groups methyl, ethyl, propyl, butyl, pentyl, hexyl and heptyl. Group [sic] having 2–5 carbon atoms are generally preferred.

The term "alkenyl" covers straight-chain and branched alkenyl groups having 2–7 carbon atoms, in particular the straight-chain groups. Particular alkenyl groups are $C_2$–$C_7$-1E-alkenyl, $C_4$–$C_7$13E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are to be preferred.

The term "fluoroalkyl" preferably covers the straight-chain groups having a terminal fluorine atom, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. Preferably, n=1 and m is from 1 to 6.

Through a suitable choice of the meanings of $R^1$ and $R^5$, the response times, the threshold voltage, the steepness of the transmission characteristic lines, etc., can be modified as desired. For example, 1E-alkenyl radicals, 3E-alkenyl radicals, 2E-alkenyloxy radicals and the like generally result in shorter response times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally result in lower threshold voltages and smaller values of $k_{33}/k_{11}$ compared with alkyl and alkoxy radicals.

A —CH$_2$CH$_2$— group in $Z^1$ or $Z^2$ generally results in higher values of $k_{33}/k_{11}$ compared with a single covalent bond. Higher values of $k_{33}/k_{11}$ facilitate, for example, flatter transmission characteristic lines in TN cells having a 90° twist (for achieving gray shades) and steeper transmission characteristic lines in STN, SPE and OMI cells (greater multiplexibility), and vice versa.

The optimum mixing ratio between the compounds of the formulae I and II+III+IV depends substantially on the desired properties, on the choice of the components of the formulae I, II, III and/or IV and on the choice of any other components present. Suitable mixing ratios within the abovementioned range can easily be determined from case to case.

The total amount of compounds of the formulae I to IV in the novel mixtures is not crucial. The mixtures may therefore contain one or more further components in order to optimize various properties. However, the observed effect on the response times and the threshold voltage is generally higher the greater the total concentration of compounds of the formulae I and II.

In a particularly preferred embodiment, the novel media comprise compounds of the formula IV, (preferably II and/or III) in which Q—X is OCF$_3$ or OCHF$_2$. A favorable synergistic effect with the compounds of the formula I results in particularly advantageous properties.

The novel liquid-crystalline media preferably comprise 2 to 40, in particular 4 to 30, components as further constituents besides one or more compounds of the formulae I, II, III and IV. These media very particularly preferably comprise 7 to 25 components besides one or more compounds according to the invention. These further constituents are preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid and of cyclohexylcyclohexanecarboxylic acid, phenylcyclohexanes, cyclohexylbiphenyls, phenylcyclohexylcyclohexanes, cyclohexylcyclohexylcyclohexenes, 1,4-bis-cyclohexylbenzenes, 4,4'-bis-cyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes optionally halogenated stilbenes, benzyl phenyl ethers, tolans and substituted cinnamic acids. The 1,4-phenylene groups in these compounds may also be fluorinated.

The most important compounds suitable as further constituents of novel media can be characterized by the formulae 1, 2, 3, 4 and 5:

| | |
|---|---|
| R'—L—E—R" | 1 |
| R'—L—COO—E—R" | 2 |

-continued

| | |
|---|---|
| R'—L—OOC—E—R" | 3 |
| R'—L—CH$_2$CH$_2$—E—R" | 4 |
| R'—L—C≡C—E—R" | 5 |

In the formulae 1, 2, 3, 4 and 5, L and E, which may be identical or different, are in each case, independently of one another, a bivalent radical from the group formed by -Phe-, -Cyc-, -Phe-Phe-, -Phe-Cyc-, -Cyc-Cyc-, -Pyr-, -Dio-, -G-Phe- and -G-Cyc- and their mirror images, where Phe is unsubstituted or fluorine-substituted 1,4-phenylene, Cyc is trans-1,4-cyclohexylene Pyr is pyrimidine-2,5-diyl or pyridine-2,5-diyl, Dio is 1,3-dioxane-2,5-diyl and G is 2-(trans-1,4-cyclohexyl)ethyl, pyrimidine-2,5-diyl, pyridine-2,5-diyl or 1,3-dioxane-2,5-diyl.

One of the radicals L and E is preferably Cyc, Phe or Pyr. E is preferably Cyc, Phe or Phe-Cyc. The novel media preferably comprise one or more components selected from the compounds of the formulae 1, 2, 3, 4 and 5 in which L and E are selected from the group consisting of Cyc, Phe and Pyr and simultaneously one or more components selected from the compounds of the formulae 1, 2, 3, 4 and 5 in which one of the radicals L and E is selected from the group consisting of Cyc, Phe and Pyr and the other radical is selected from the group consisting of -Phe-Phe-, -Phe-Cyc-, -Cyc-Cyc-, -G-Phe- and -G-Cyc-, and optionally one or more components selected from the compounds of the formulae 1, 2, 3, 4 and 5 in which the radicals L and E are selected from the group consisting of -Phe-Cyc-, -Cyc-Cyc-, -G-Phe- and -G-Cyc-.

In a smaller sub-group of the compounds of the formulae 1, 2, 3, 4 and 5, R' and R" are in each case, independently of one another, alkyl, alkenyl, alkoxy, alkoxyalkyl, alkenyloxy or alkanoyloxy having up to 8 carbon atoms. This smaller sub-group is called group A below, and the compounds are labeled with the sub-formulae 1a, 2a, 3a, 4a and 5a. In most of these compounds, R' and R" are different from one another, one of these radicals usually being alkyl, alkenyl, alkoxy or alkoxyalkyl.

In another smaller sub-group of the compounds of the formulae 1, 2, 3, 4 and 5 which is known as group B, R" is —F, —Cl, —NCS or —(O)$_i$CH$_3$-(k+1) F$_k$Cl$_1$, where i is 0 or 1, and k+1 is 1, 2 or 3; the compounds in which R" has this meaning are labeled with the sub-formulae 1b, 2b, 3b, 4b and 5b. Particular preference is given to those compounds of the sub-formulae 1b, 2b, 3b, 4b and 5b in which R" is —F, —Cl, —NCS, —CF$_3$, —OCHF$_2$ or —OCF$_3$.

In the compounds of the sub-formulae 1b, 2b, 3b, 4b and 5b, R' is as defined for the compounds of the sub-formulae 1a–5a and is preferably alkyl, alkenyl, alkoxy or alkoxyalkyl.

In a further smaller sub-group of the compounds of the formulae 1, 2, 3, 4 and 5, R" is —CN; this sub-group is known as group C below, and the compounds of this sub-group are correspondingly described by sub-formulae 1c, 2c, 3c, 4c and 5c. In the compounds of the sub-formulae 1c, 2c, 3c, 4c and 5c, R' is as defined for the compounds of the sub-formulae 1a–5a and is preferably alkyl, alkoxy or alkenyl.

In addition to the preferred compounds of groups A, B and C, other compounds of the formulae 1, 2, 3, 4 and 5 having other variants of the proposed substituents are also customary. All these substances can be obtained by methods which are known from the literature or analogously thereto.

Besides compounds of the formula I according to the invention, the novel media preferably contain one or more compounds selected from group A and/or group B and/or group C. The proportions by weight of the compounds from these groups in the novel media are preferably Group A:0 to 90%, preferably 20 to 90%, in particular 30 to 90%

Group B:0 to 80%, preferably 10 to 80%, in particular 10 to 65%

Group C:0 to 80%, preferably 5 to 80%, in particular 5 to 50%, the sum of the proportions by weight of the group A and/or B and/or C compounds present in the particular novel media preferably being 5%–90% and in particular 10% to 90%.

The novel media preferably comprise 1 to 40%, particularly preferably 5 to 30%, of compounds according to the invention. Further preferred media are those which contain more than 40%, in particular 45 to 90%, of compounds according to the invention. The media preferably contain three, four or five compounds according to the invention.

The structure of the IPS display according to the invention corresponds to the usual construction for such displays, as described, for example, in WO 91/10936 or EP 0 588 568. The term conventional construction is broadly drawn here and also covers all derivatives and modifications of the IPS display, in particular, for example, including matrix display elements based on poly-Si TFT or MIM.

However, an essential difference between the displays according to the invention and those conventional hitherto is in the choice of the liquid-crystal parameters of the liquid-crystal layer.

The liquid-crystal mixtures which can be used in accordance with the invention are prepared in a manner conventional per se. In general, the desired amount of the components used in lesser amount is dissolved in the components making up the principal constituent, expediently at elevated temperature. It is also possible to mix solutions of the components in an organic solvent, for example in acetone, chloroform or methanol, and, after mixing, to remove the solvent again, for example by distillation.

The dielectrics may also contain further additives known to the person skilled in the art and described in the literature. For example, 0–15% of pleochroic dyes or chiral dopants can be added.

C denotes a crystalline phase, S a smectic phase, $S_B$ a smectic B phase, N a nematic phase and I the isotropic phase.

$V_{10}$ denotes the voltage for 10% transmission (viewing angle perpendicular to the plate surface). $t_{on}$ denotes the switch-on time and $t_{off}$ the switch-off time at an operating voltage corresponding to 2.5 times the value of $V_{10}$. $\Delta n$ denotes the optical anisotropy and $n_0$ the refractive index (in each case at 589 nm). $\Delta\epsilon$ denotes the dielectric anisotropy ($\Delta\epsilon=\epsilon_\parallel-\epsilon_\perp$, where $\epsilon_\parallel$ denotes the dielectric constant parallel to the longitudinal axes of the molecules and $\epsilon_\perp$ denotes the dielectric constant perpendicular thereto. The electro-optical data were measured in an IPS cell at 20° C., unless expressly stated otherwise. The optical data were measured at 20° C., unless expressly stated otherwise.

An IPS test cell as described in WO 91/10936 having a comb structure was employed, in which the electrodes and the spaces between the electrodes have a separation of 20 μm.

The layer thickness d of the liquid-crystal material is 5 μm. The cell furthermore has:

| | |
|---|---|
| Initial twist angle: | 0° |
| Alignment angle: | 5° |
| Tilt angle | 3° |

The cells are dark in the "off" state.

In the present application and in the examples below, the structures of the liquid-crystal compounds are indicated by acronyms, the transformation into chemical formulae taking place as in Tables A and B below. All the radicals $C_nH_{2n+1}$ or $C_mH_{2m+1}$ are straight-chain alkyl radicals containing n or m carbon atoms respectively. The coding in Table B is self-evident. In Table A, only the acronym for the parent structure is given. In individual cases, the acronym for the parent structure is followed, separated by a hyphen, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | F | H |
| nN.F.F | $C_nH_{2n+1}$ | CN | F | F |
| nCF$_3$ | $C_nH_{2n+1}$ | CF$_3$ | H | H |
| nOCF$_3$ | $C_nH_{2n+1}$ | OCF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | COOC$_m$H$_{2m+1}$ | H | H |
| nF.F.F | $C_nH_{2n+1}$ | F | F | F |
| nCl.F.F | $C_nH_{2n+1}$ | Cl | F | F |
| nCF$_3$.F.F | $C_nH_{2n+1}$ | CF$_3$ | F | F |
| nOCF$_3$.F.F | $C_nH_{2n+1}$ | OCF$_3$ | F | F |
| nOCF$_2$.F.F | $C_nH_{2n+1}$ | OCHF$_3$ | F | F |
| nOCF$_3$.F | $C_2H_{2n+1}$ | OCF$_3$ | F | H |

TABLE A

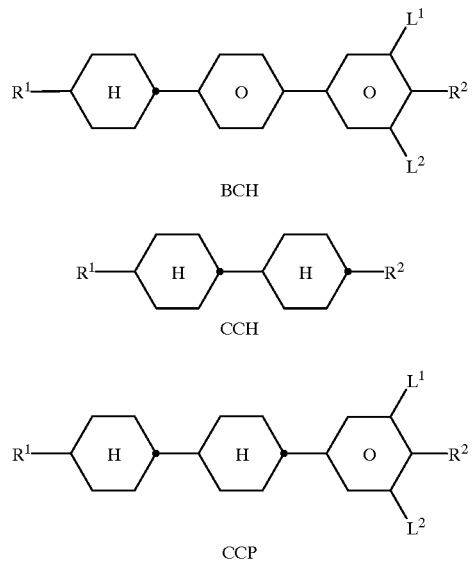

BCH

CCH

CCP

TABLE A-continued
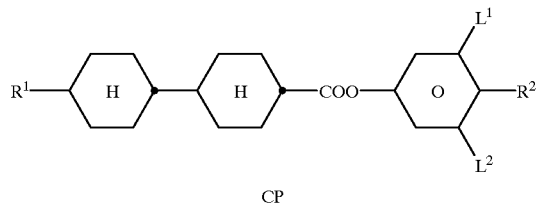
CP
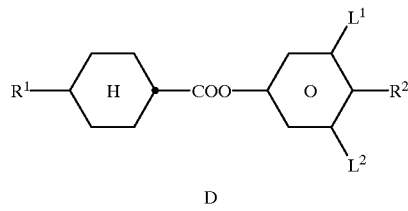
D
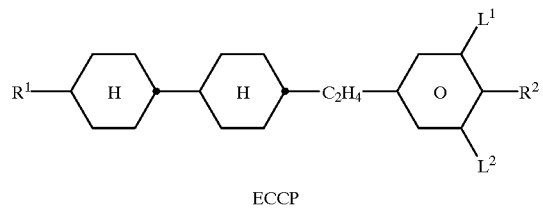
ECCP
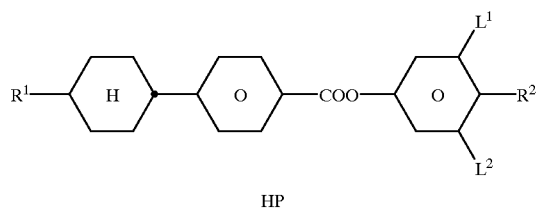
HP
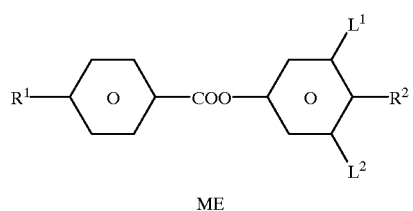
ME
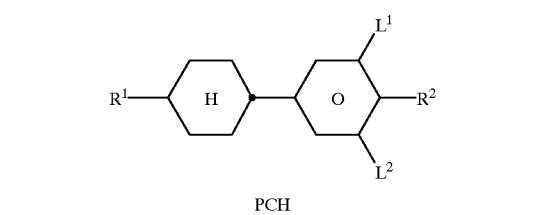
PCH
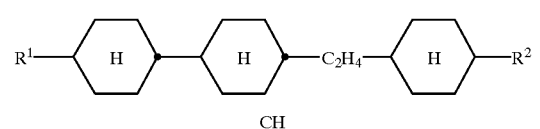
CH
TABLE A-continued
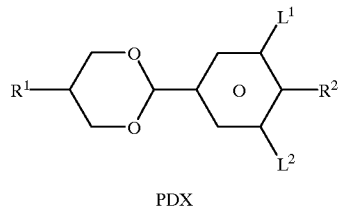
PDX
TABLE B
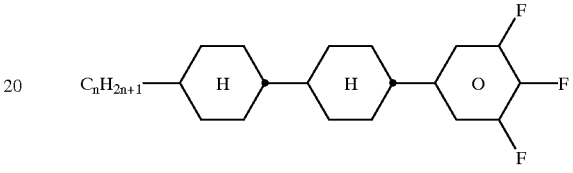
CCP-nF.F.F
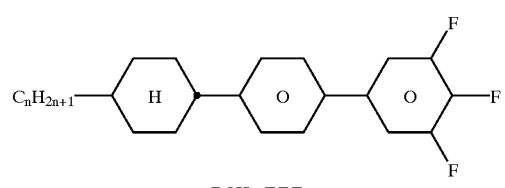
BCH-nF.F.F
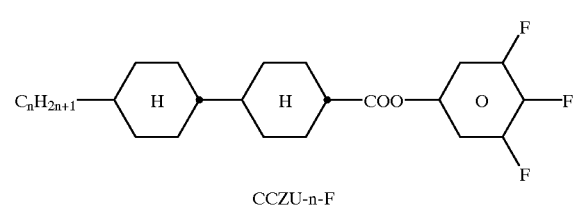
CCZU-n-F
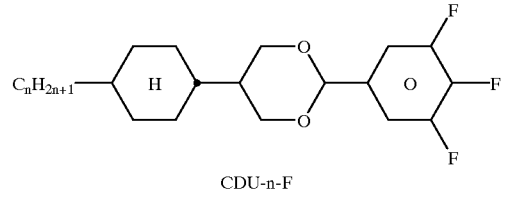
CDU-n-F
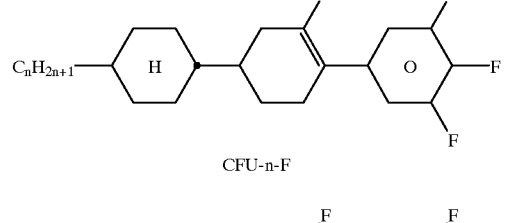
CFU-n-F
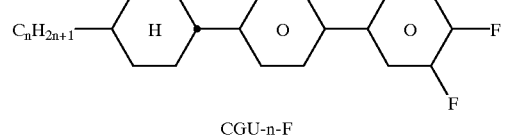
CGU-n-F

TABLE B-continued $$C_nH_{2n+1}\begin{array}{c}\phantom{xx}\\ \text{[structure]}\end{array}CN$$

DU-n-N

Even without further comments, it is assumed that a person skilled in the art can use the above description in the broadest scope. The preferred embodiments are therefore merely to be regarded as a descriptive disclosure, and in no way as limiting.

The full disclosure of all the applications, patents and publications mentioned above and below, and the corresponding applications P 195 03 507 of 03.02.1995,
P 195 09 791 of 17.03.1995,
P 195 28 104 of 01.08.1995
P 195 28 106 of 01.08.1995,
P 195 28 107 of 01.08.1995 and
P 195 37 802 of 11.10.1995 are incorporated in this application by way of reference.

EXAMPLE 1

An IPS display containing a nematic mixture having

| clearing point | +73° C. |
|---|---|
| $\Delta n$ | 0.0819 |
| $n_o$ | 1.4784 |
| $\Delta\epsilon$ | 9.0 |
| $\epsilon_\perp$ | 4.3 |
| viscosity (20° C.) | 18 mm$^2$s$^{-1}$ | comprising

| PCH-3 | 25.00 |
|---|---|
| ME2N.F | 3.00 |
| ME3N.F | 3.00 |
| HP-3N.F | 3.00 |
| CCH-303 | 7.00 |
| CCH-501 | 7.00 |
| CCP-3F.F.F | 9.00 |
| CCP-5F.F.F | 9.00 |
| CCH-34 | 11.00 |
| CCH-35 | 11.00 |
| CH-33 | 3.00 |
| CH-35 | 3.00 |
| CH-43 | 3.00 |
| CH-45 | 3.00 | and has high contrast and low response times.

EXAMPLE 2

An IPS display containing a nematic mixture having

| clearing point | +75° C. |
|---|---|
| $\Delta n$ | 0.0805 |
| $n_o$ | 1.4755 |
| $\Delta\epsilon$ | 8.7 |
| $\epsilon_\perp$ | 4.1 |
| viscosity (20° C.) | 24 mm$^2$s$^{-1}$ | comprising

| PCH-3 | 25.00 |
|---|---|
| CCH-3 | 11.00 |
| CCH-34 | 10.00 |
| CCP-30CF2.F.F | 10.00 |
| CCP-50CF2.F.F | 10.00 |
| CCP-3F.F.F | 10.00 |
| CCP-5F.F.F | 10.00 |
| CH-33 | 4.00 |
| CH-35 | 3.00 |
| CCH-501 | 7.00 | and has high contrast and low response times.

EXAMPLE 3

An IPS display containing a nematic mixture having

| clearing point | +75° C. |
|---|---|
| $\Delta n$ | 0.0813 |
| $n_o$ | 1.4760 | comprising

| PCH-3 | 25.00 |
|---|---|
| CCH-3 | 8.00 |
| CCH-34 | 10.00 |
| CCP-30CF2.F.F | 11.00 |
| CCP-50CF2.F.F | 10.00 |
| CCP-3F.F.F | 11.00 |
| CCP-5F.F.F | 11.00 |
| CH-33 | 4.00 |
| CH-35 | 3.00 |
| CCH-501 | 7.00 | and has high contrast and low response times.

EXAMPLE 4

An IPS display containing a nematic mixture having

| clearing point | 81° C. |
|---|---|
| $\Delta n$ | 0.0811 |
| $n_o$ | 1.4753 | comprising

| PCH-3 | 25.00 |
|---|---|
| CCH-303 | 9.00 |
| CCH-501 | 9.00 |
| CCP-30CF2.F.F | 11.00 |
| CCP-50CF2.F.F | 11.00 |
| CCP-3F.F.F | 11.00 |
| CCP-5F.F.F | 11.00 |
| CH-33 | 4.00 |
| CH-43 | 3.00 CH-35 3.00 |
| CH-45 | 3.00 | and has high contrast and low response times.

EXAMPLE 5

An IPS display containing a nematic mixture having

| clearing point | +77° C. |
|---|---|
| $\Delta n$ | 0.0820 |
| $n_o$ | 1.4744 | comprising

| PCH-3 | 25.00 |
|---|---|
| CCH-303 | 9.00 |
| CCH-501 | 3.00 |
| CCP-30CF3 | 4.00 |
| CCP-30CF2.F.F1 | 11.00 |
| CCP-50CF2.F.F1 | 11.00 |
| CCP-3F.F.F | 11.00 |
| CCP-5F.F.F | 11.00 |
| CCH-34 | 10.00 |
| CH-35 | 5.00 | and has high contrast and low response times.

EXAMPLE 6

An IPS display containing a nematic mixture having

| clearing point | +77° C. |
|---|---|
| $\Delta n$ | 0.0832 |
| $n_o$ | 1.4758 | comprising

| PCH-3 | 23.00 |
|---|---|
| OCH-303 | 9.00 |
| CRP-30CF2.F.F | 11.00 CCP-50CF2.F.F 11.00 |
| CCP-3F.F.F | 11.00 |
| CCP-5F.F.F | 11.00 |
| CCP-34 | 17.00 |
| BCH-3F.F.F | 4.00 |
| CCPC-33 | 3.00 | and has high contrast and low response times.

EXAMPLE 7

An IPS display containing a nematic mixture having

| clearing point | +69° C. |
|---|---|
| $\Delta n$ | 0.0811 |
| $n_o$ | 1.4766 |
| $\Delta \epsilon$ | 13.2 |
| $\epsilon_\perp$ | 4.2 |
| S-N | <−30° C. | comprising

| ME2N.F | 4.00 |
|---|---|
| ME3N.F | 4.00 |
| ME5N.F | 10.00 |
| ME7N.F | 5.00 |
| CCH-2 | 12.00 |
| CCH-3 | 12.00 |
| CCH-4 | 12.00 |
| CCP-3F.F.F | 6.00 |
| CCP-5F.F.F | 6.00 |
| CH-33 | 5.00 |
| CH-35 | 5.00 |
| CH-43 | 5.00 |
| CCH-34 | 10.00 |
| CCH-303 | 4.00 | and has high contrast and low response times.

EXAMPLES 8 to 10

The following example relates to IPS displays containing nematic mixtures which include CFU-n-F

| Example | | 8 | | 9 | | 10 |
|---|---|---|---|---|---|---|
| Clearing point (° C.) | | +88 | | +85 | | +74 |
| Rot. visc. $\gamma_1$ [mPa · s] 20° C. | | 136 | | — 122 | | |
| Spec. resistivity [Ω · cm] (20° C.) | | 2.9E12 | | — | | 1.7E11 |
| $\Delta n$ (589 nm, 20° C.) | | +0.0769 | | +0.0810 | | +0.0800 |
| $\Delta \epsilon$ (1 kHz, 20° C.) | | +7.8 | | +9.1 | | +9.5 |
| $V_{(10.0.20)}$ [V] | | 1.29 | | 1.05 | | 0.95 |
| $V_{(90.0.20)}$ [V] | | — | | — | | — |
| $K_1 [10^{-12}N]$ 20° C. | | 11.6 | | 9.1 | | 7.7 |
| $K_3 [10^{-12}N]$ 20° C. | | 17.2 | | 18.2 | | 15.7 |
| Composition [%]: | PCH-7F | 9.00 | PCH-7F | 7.00 | PCH-7F | 8.00 |
| | CCP-20CF2.F.F | 8.00 | CCP-30CF2.F.F | 6.00 | CCP-30CF2.F.F | 7.00 |
| | CCP-30CF2.F.F | 6.00 | CCP-50CF2.F.F | 5.00 | CCP-20CF3 | 11.00 |
| | CCP-50CF2.F.F | 5.00 | CCP-20CF3 | 8.00 | CCP-30CF3 | 13.00 |
| | CCP-20CF3 | 14.00 | CCP-30CF3 | 11.00 | CCP-2F.F.F | 15.00 |
| | CCP-30CF3 | 12.00 | CCP-50CF3 | 10.00 | CCP-3F.F.F | 14.00 |
| | CCP-50CF3 | 10.00 | CCP-2F.F.F | 15.00 | CCP-5F.F.F | 9.00 |
| | CCP-2F.F.F | 16.00 | CCP-3F.F.F | 12.00 | CFU-2-F | 12.00 |
| | CCP-3F.F.F | 11.00 | CCP-5F.F.F | 10.00 | CFU-3-F | 11.00 |
| | CCP-5F.F.F | 9.00 | CFU-2-F | 6.00 | | |
| | | | CFU-3-F | 10.00 | | |

EXAMPLES 11 to 14

The following examples relate to IPS displays containing nematic mixtures which include CCZU-n-F

| Example | | 11 | | 12 | | 13 | | 14 |
|---|---|---|---|---|---|---|---|---|
| Clearing point (° C.) | | 78 | | +68 | | +76 | | +73 |
| Rot. visc. $\gamma_1$ [mPa · s] 20° C. | | 111 | | 108 | | 101 | | 105 |
| Spec. resistivity [Ω · cm] (20° C.) | | 2.8E11 | | 3.0e11 | | 4.4e11 | | 2.3E11 |
| Δn (589 nm, 20° C.) | | +0.0765 | | +0.0758 | | +0.0762 | | +0.0742 |
| Δε (1 kHz, 20° C.) | | +10.4 | | +10.6 | | +9.7 | | — |
| $V_{(10,0,20)}$ [V] | | 0.94 | | 0.87 | | 1.06 | | 0.93 |
| $V_{(90,0,20)}$ [V] | | — | | — | | — | | — |
| $K_1$ [$10^{-12}$N] 20° C. | | 8.2 | | 7.2 | | 9.7 | | 8.2 |
| $K_3$ [$10^{-12}$N] 20° C. | | 14.8 | | 14.4 | | 15.4 | | 14.5 |
| Composition [%]: | PCH-3 | 17.00 | PCH-7F | 9.00 | CCP-2F.F.F | 12.00 | CCP-2F.F.F | 12.00 |
| | CCP-2.F.F.F | 16.00 | CCP-2.F.F.F | 16.00 | CCP-3F.F.F | 11.00 | CCP-3F.F.F | 9.00 |
| | CCP-3F.F.F | 13.00 | CCP-3F.F.F | 13.00 | CCP-5F.F.F | 8.00 | CCP-5F.F.F | 8.00 |
| | CCP-5F.F.F | 8.00 | CCP-5F.F.F | 9.00 | CCP-20CF3 | 10.00 | CCP-20CF3 | 5.00 |
| | CCP-20CF3 | 4.00 | CCP-20CF3 | 16.00 | CCP-30CF3 | 10.00 | CCP-30CF3 | 8.00 |
| | CCZU-3-F | 16.00 | CCP-30CF3 | 8.00 | CCP-50CF3 | 10.00 | CCP-50CF3 | 5.00 |
| | CCZU-5-F | 13.00 | PDX-3 | 11.00 | PDX-3 | 11.00 | PDX-3 | 11.00 |
| | CCH-34 | 8.00 | CCZU-3-F | 10.00 | CCH-35 | 8.00 | CCH-35 | 8.00 |
| | CCH-35 | 5.00 | CCZU-5-F | 8.00 | PCH-7F | 7.00 | PCH-7F | 7.00 |
| | | | | | CCZU-2-F | 7.00 | CCZU-2-F | 7.00 |
| | | | | | CCZU-3-F | 6.00 | CCZU-3-F | 13.00 |
| | | | | | | | CCZU-5-F | 6.00 |

EXAMPLES 15 to 21

The following examples relate to IPS displays containing nematic mixtures which include CDU-n-F or CGU-n-F

| Example | | 15 | | 16 | | 17 | | 18 |
|---|---|---|---|---|---|---|---|---|
| Clearing point (° C.) | | +65 | | +80 | | +64 | | +71 |
| Rot. visc. $\gamma_1$ [mPa · s] 20° C. | | 104 | | 136 | | 115 | | 95 |
| Spec. resistivity [Ω · cm] (20° C.) | | 3.3e11 | | 4.2E12 | | 1.3e12 | | 9.0E11 |
| Δn (589 nm, 20° C.) | | +0.0703 | | +0.0852 | | +0.0744 | | +0.0758 |
| Δε (1 kHz, 20° C.) | | +10.1 | | +10.0 | | +10.9 | | +10.4 |
| $V_{(10,0,20)}$ [V] | | 1.00 | | 1.05 | | 0.90 | | 1.04 |
| $K_1$ [$10^{-12}$N] 20° C. | | 9.1 | | 9.9 | | 7.8 | | 10.1 |
| $K_3$ [$10^{-12}$N] 20° C. | | 13.1 | | 13.6 | | 10.9 | | 13.7 |
| Composition [%]: | PCH-7F | 9.00 | CCP-20CF2.F.F | 9.00 | CCP-20CF3 | 16.00 | PCH-3 | 11.00 |
| | CCP-20CF3 | 16.00 | CCP-20CF3 | 13.00 | CCP-30CF3 | 10.00 | CCP-2F.F.F | 16.00 |
| | CCP-30CF3 | 12.00 | CCP-30CF3 | 10.00 | CCP-2F.F.F | 16.00 | CCP-3F.F.F | 12.00 |
| | CCP-2F.F.F | 16.00 | CCP-50CF3 | 8.00 | CCP-3F.F.F | 14.00 | CCP-5F.F.F | 5.00 |
| | CCP-3F.F.F | 11.00 | CCP-2F.F.F | 16.00 | CCP-5F.F.F | 12.00 | CCP-20CF3 | 16.00 |
| | CCP-5F.F.F | 9.00 | CCP-3F.F.F | 14.00 | CGU-2-F | 12.00 | CCP-30CF3 | 5.00 |
| | CDU-2-F | 12.00 | CCP-5F.F.F | 12.00 | CGU-3-F | 4.00 | CDU-3-F | 22.00 |
| | CDU-3-F | 9.00 | CGU-2-F | 12.00 | CDU-2-F | 12.00 | CCH-34 | 8.00 |
| | CDU-5-F | 6.00 | CGU-3-F | 6.00 | CDU-3-F | 4.00 | CCH-35 | 5.00 |

| Example | | 19 | | 20 | | 21 |
|---|---|---|---|---|---|---|
| Clearing point (8 ° C.) | | +78 | | +65 | | +60 |
| Rot. visc. $\gamma_1$ [mPa · s] 20° C. | | 86 | | 104 | | 109 |
| Spec. resistivity [Ω · cm] (20° C.) | | 3.8e12 | | 3.3e11 | | — |
| Δn (589 nm, 20° C.) | | +0.0663 | | +0.0703 | | +0.0756 |
| Δε (1 kHz, 20° C.) | | +8.0 | | +10.1 | | +13.7 |
| $V_{(20,0,20)}$ [V] | | 1.22 | | 1.00 | | 0.70 |
| $K_1$ [$10^{-12}$N] 20° C. | | 10.7 | | 9.1 | | 6.0 |
| $K_3$ [$10^{-12}$N] 20° C. | | 13.7 | | 13.1 | | 14.5 |
| Composition [%]: | CCP-2F.F.F | 16.00 | PCH-7F | 9.00 | CCP-2F.F.F | 16.00 |
| | CCP-3F.F.F | 12.00 | CCP-20CF3 | 16.00 | CCP-3F.F.F | 14.00 |
| | CCP-5F.F.F | 6.00 | CCP-30CF3 | 12.00 | CCP-5F.F.F | 11.00 |
| | CCP-20CF3 | 16.00 | CCP-2F.F.F | 16.00 | CCP-20CF3 | 17.00 |
| | CCP-30CF3 | 10.00 | CCP-3F.F.F | 11.00 | CCP-30CF3 | 14.00 |
| | CDU-2-F | 10.00 | CCP-5F.F.F | 9.00 | PDX-2N.F | 3.00 |
| | CDU-3-F | 8.00 | CDU-2-F | 12.00 | PDX-3N.F | 6.00 |
| | CDU-5-F | .00 | CDU-3-F | 9.00 | PDX-5N.F | 11.00 |

|        |       |        |      |        |      |
|--------|-------|--------|------|--------|------|
| CCH-34 | 10.00 | CDU-5-F | 6.00 | CDU-3-F | 8.00 |
| CCH-35 | 8.00  |        |      |        |      |
| PCH-7F | 4.00  |        |      |        |      |

EXAMPLE 22

An IPS display containing a nematic mixture having

| | |
|---|---|
| clearing point | +68° C. |
| $\Delta n$ | 0.0789 |
| $n_o$ | 1.4725 |
| $\Delta \epsilon$ | 12.7 |
| $\epsilon_\perp$ | 5.1 |
| viscosity (20° C.) | 18 mm²s⁻¹ |
| $K_1$ [$10^{-12}$N] (20° C.) | 7.4 |
| $K_3$ [$10^{-12}$N] (20° C.) | 15.6 | comprising

| | |
|---|---|
| PCH-3 | 6.00 |
| CCP-2OCF$_2$.F.F | 12.00 |
| CCP-2F.F.F | 17.00 |
| CCP-3F.F.F | 14.00 |
| CCP-5F.F.F | 13.00 |
| CCP-2OCF$_3$ | 15.00 |
| CCP-3OCF$_3$ | 13.00 |
| PDX-3N.F.F | 5.00 |
| PDX-5N.F.F | 5.00 | and has high contrast and low response times.

EXAMPLE 23

An IPS display containing a nematic mixture having

| | |
|---|---|
| clearing point | 75 |
| $\Delta n$ | 0.0800 |
| $n_o$ | 1.4735 |
| $\Delta \epsilon$ | 11.7 |
| $\epsilon_\perp$ | 4.8 |
| viscosity (20° C.) | 24 mm²s⁻¹ | comprising

| | |
|---|---|
| PCH-3 | 6.00 |
| CCP-2OCF$_2$.F.F | 12.00 |
| CCP-2F.F.F | 17.00 |
| CCP-3F.F.F | 14.00 |
| CCP-5F.F.F | 13.00 |
| CCP-2OCF$_3$ | 15.00 |
| CCP-3OCF$_3$ | 13.00 |
| PDX-3N.F.F | 5.00 |
| PDX-5N.F.F | 5.00 | and has high contrast and low response times.

EXAMPLE 24

An IPS display containing a nematic mixture comprising

| | |
|---|---|
| PCH-3 | 10.00 |
| PDX-3N.F | 14.00 |
| PDX-3N.F.F | 9.00 |
| CCP-3OCF2.F.F | 11.00 |
| CCP-5OCF2.F.F | 10.00 |
| CCP-3F.F.F | 11.00 |
| CCP-5F.F.F | 11.00 |
| CH-33 | 4.00 |
| CH-35 | 3.00 |
| CCH-501 | 7.00 | and has high contrast and low response times.

EXAMPLE 25

An IPS display containing a nematic mixture having

| | | | |
|---|---|---|---|
| PCH-3 | 7.00 | clearing point | +60° C. |
| PCH-7F | 2.00 | $\Delta n$ | 0.0798 |
| CCP-2F.F.F | 16.00 | $\Delta \epsilon$ | +12.6 |
| CCP-3F.F.F | 10.00 | $\epsilon_\perp$ | 5.6 |
| CCP-5F.F.F | 9.00 | $\epsilon_\|$ | 18.2 |
| CCP-2OCF$_3$ | 16.00 | rotational viscosity (20° C.) | 97 mPa · s |
| CCP-3OCF$_3$ | 15.00 | $V_{10}$ | 0.77 V |
| CCP-4OCF$_3$ | 5.00 | spec. resistance | $4.9 \cdot 10^{10}$ Ω · cm |
| PDX-2N.F | 5.00 | $K_1$ | $6.6 \cdot 10^{-12}$N |
| PDX-3N.F | 5.00 | $K_3$ | $14.7 \cdot 10^{-12}$N |
| PDX-5N.F | 4.00 | | |
| PDX-3 | 6.00 | | | and has high contrast and low response times.

EXAMPLE 26

An IPS display containing a nematic mixture comprising

| | | | |
|---|---|---|---|
| PCH-3 | 11.00 | clearing point | +83° C. |
| CCP-2F.F.F | 16.00 | $\Delta n$ | 0.0809 |
| CCP-3F.F.F | 10.00 | $\Delta \epsilon$ | +10.3 |
| CCP-5F.F.F | 7.00 | $\epsilon_\perp$ | +4.0 |
| CCP-2OCF$_3$ | 16.00 | rotational viscosity (20° C.) | 105 mPa · s |
| CCP-3OCF$_3$ | 15.00 | $V_{10}$ | 1.05 V |
| CCP-5OCF$_3$ | 11.00 | spec. resistance | $3.4 \cdot 10^{11}$ Ω · cm |
| PDX-2N.F | 5.00 | | |
| CCH-34 | 6.00 | | | and has high contrast and low response times.

EXAMPLE 27

An IPS display containing a nematic mixture having

| | | | |
|---|---|---|---|
| PCH-3 | 6.00 | clearing point | +68° C. |
| CCP-2OCF2.F.F | 12.00 | $\Delta n$ | 0.0789 |
| CCP-2F.F.F | 17.00 | $\Delta \epsilon$ | 12.7 |
| CCP-3F.F.F | 14.00 | $\epsilon_\perp$ | 5.1 |
| CCP-2OCF$_3$ | 15.00 | $V_{10}$ | 0.81 V |
| CCP-3OCF$_3$ | 13.00 | $K_1$ | $7.4 \cdot 10^{-12}$N |
| DU-3-N | 5.00 | $K_3$ | $15.6 \pm 10^{-12}$N |
| DU-5-N | 5.00 | | | and has high contrast and low response times.

EXAMPLE 28

An IPS display containing a nematic mixture having

| | | | |
|---|---|---|---|
| CCP-2F.F.F | 16.00 | clearing point | +60° C. |
| CCP-3F.F.F | 14.00 | $\Delta n$ | 0.0756 |
| CCP-5F.F.F | 11.00 | $\Delta \epsilon$ | +13.7 |
| CCP-2OCF$_3$ | 17.00 | $\epsilon_\perp$ | +6.1 |
| CCP-3OCF$_3$ | 14.00 | rotational viscosity (20° C.) | 109 mPa · s |
| PDX-2N.F$_3$ | 3.00 | $V_{10}$ | 0.70 V |
| PDX-3N.F | 6.00 | $K_1$ | $6.0 \cdot 10^{-12}$ N |
| PDX-5N.F | 11.00 | $K_3$ | $14.5 \cdot 10^{-12}$ N |
| CDU-3-F | 8.00 | | | and has high contrast and low response times.

EXAMPLE 29

An IPS display containing a nematic mixture having

| | | | |
|---|---|---|---|
| PCH-3 | 7.00 | clearing point | +71° C. |
| CCP-2F.F.F | 16.00 | $\Delta n$ | 0.0777 |
| CCP-3F.F.F | 7.00 | $\Delta \epsilon$ | +10.6 |
| CCP-5F.F.F | 9.00 | $\epsilon_\perp$ | 4.7 |
| CCP-2OCF$_3$ | 16.00 | rotational viscosity (20° C.) | 88 mPa · s |
| CCP-3OCF$_3$ | 15.00 | $V_{10}$ | 0.94 V |
| CCP-5OCF$_3$ | 4.00 | $K_1$ | $8.5 \cdot 10^{-12}$ N |
| PDX-2N.F | 5.00 | $K_3$ | $15.2 \cdot 10^{-12}$ N |
| PDX-3N.F | 5.00 | | |
| PDX-5N.F | 3.00 | | |
| CCH-34 | 8.00 | | |
| CCH-35 | 5.00 | | | and has high contrast and low response times.

EXAMPLE 30

An IPS display contains a nematic mixture having

| | | | |
|---|---|---|---|
| CCP-2F.F.F | 16.00 | clearing point | +76° C. |
| CCP-3F.F.F | 13.00 | $\Delta \epsilon$ | +9.0 |
| CCP-5F.F.F | 9.00 | $\epsilon_\perp$ | +3.9 |
| CCP-2OCF$_3$ | 16.00 | $\Delta n$ | 0.0768 |
| CCP-3OCF$_3$ | 15.00 | $V_{10}$ | 1.16 V |
| CCP-5OCF$_3$ | 5.00 | rotational viscosity (20° C.) | 93 mPa · s |
| PDX-3 | 11.00 | spec. resistance | $2.3 \cdot 10^{12}$ $\Omega \cdot$ cm |
| CCH-34 | 10.00 | | |
| PCH-7F | 5.00 | | | which has high contrast and low response times.

EXAMPLE 31

An IPS display containing a nematic mixture having

| | |
|---|---|
| clearing point | +68° C. |
| $\Delta n$ | 0.0776 |
| $n_o$ | 1.4725 |
| $\Delta \epsilon$ | +10.6 |
| $\epsilon_\perp$ | 5.1 |
| viscosity (20° C.) | 82 mPa · s |
| $K_1$ [$10^{-12}$N] (20° C.) | 9.8 |
| $K_3$ [$10^{-12}$N] (20° C.) | 12.1 |
| spec. resistance | $6.7 \cdot 10^{11}$ $\Omega$ cm | comprising

| | |
|---|---|
| PCH-3 | 8.00 |
| CCP-2F.F.F | 13.00 |
| CCP-3F.F.F | 7.00 |
| CCP-5F.F.F | 9.00 |
| CCP-2OCF$_3$ | 16.00 |
| CCP-3OCF$_3$ | 15.00 |
| CCP-5OCF$_3$ | 5.00 |
| PCH-2N.F.F | 6.00 |
| PCH 3N.F.F | 8.00 |
| CCH-34 | 8.00 |
| CCH-35 | 5.00 | and has high contrast and low response times.

EXAMPLE 32

An IPS display containing a nematic mixture having

| | |
|---|---|
| clearing point | +76° C. |
| $\Delta n$ | 0.0776 |
| $n_o$ | 1.4725 |
| $\Delta \epsilon$ | +10.8 |
| $\epsilon_\perp$ | 4.4 |
| $K_1$ [$10^{-12}$N] (20° C.) | 8.1 |
| $K_3$ [$10^{-12}$N] (20° C.) | 12.9 | comprising

| | |
|---|---|
| PCH-3 | 5.00 |
| CCP-2F.F.F | 13.00 |
| CCP-3F.F.F | 9.00 |
| CCP-5F.F.F | 9.00 |
| CCP-2OCF$_3$ | 15.00 |
| CCP-3OCF$_3$ | 14.00 |
| CCP-5OCF$_3$ | 5.00 |
| D-3N.F.F. | 12.00 |
| D-5N.F | 5.00 |
| CCH-34 | 8.00 |
| CCH-35 | 5.00 | and has high contrast and low response times.

The IPS displays of Examples 1 to 32 are distinguished by low addressing voltage and give good voltage holding ratio values in cells as per embodiment 1 of EP 0 58 568.

Comparative Example

An IPS display containing a nematic mixture

| | |
|---|---|
| clearing point | 64° C. |
| $\Delta n$ | 0.0813 |
| $\Delta \epsilon$ | +12.0 | comprising

| | |
|---|---|
| ME2N.F | 4.00 |
| ME3N.F | 4.00 |
| ME5N.F | 10.00 |
| ME7N.F | 6.00 |
| CCH-2 | 12.00 |
| CCH-3 | 12.00 |
| CCH-4 | 12.00 |
| CCP-30CF3 | 6.00 |
| CCP-50CF3 | 6.00 |
| CH-33 | 3.00 |
| CH-35 | 3.00 |
| CCH-34 | 10.00 |
| CCH-35 | 4.00 |
| CCH-303 | 4.00 |
| CCH-501 | 4.00 | and has lower contrast and a higher response time than the displays of Examples 1 to 32.

We claim:
1. Electro-optical liquid crystal display having a realignment layer for realigning the liquid crystals whose field has a component parallel to the liquid crystal layer sufficient for leading to in-plane switching, and which contains a liquid crystalline medium of positive dielectric anisotropy, characterized in that the medium comprises at least one compound of the formula Ia

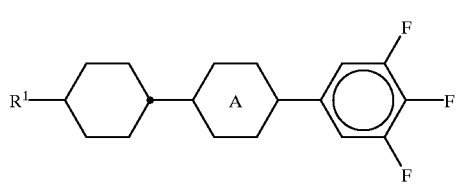

and at least one compound of formula Ib

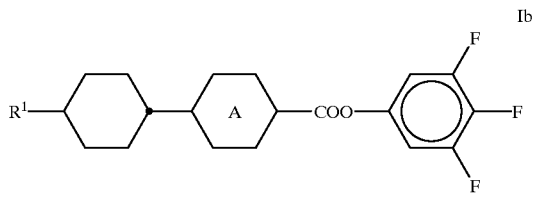

in which

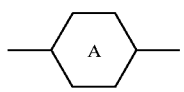

is in each case

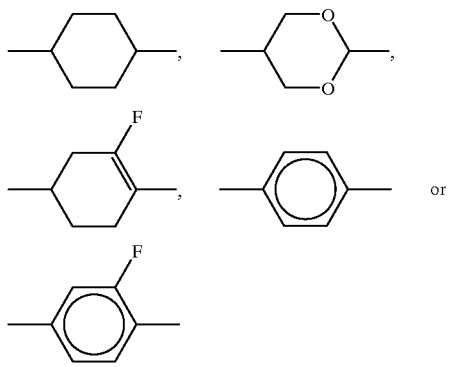

and $R^1$ is H, an alkyl or alkenyl radical having 1 to 15 carbon atoms which is unsubstituted, monosubstituted by CN or $CF_3$ or at least monosubstituted by halogen, where one or more $CH_2$ groups in these radicals may also, in each case independently of one another, be replaced by —O—, —S—, —CO—, —CO—O—, —O—CO— or —O—CO— in such a way, that O-atoms are not linked directly to one another, and at lease one compound of formula II

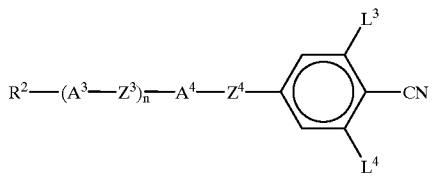

in which $L^3$ and $L^4$ are each H or F, $R^2$ is as defined for $R^1$, and $A^3$ and $A^4$ are each, independently of one another, a
  a) trans-1,4-cyclohexylene radical or 1,4-cyclohexenylene radical, in which, in addition, one or more non-adjacent $CH_2$ groups may be replaced by —O— and/or —S—,
  b) 1,4-phenylene radical, in which, in addition, one or two CH groups may be replaced by N,
  c) radical from the group consisting of 1,4-dicyclo(2,2,2)octylene, piperidine-1,4-diyl, naphthaline-2,6-diyl, decahydronaphthaline-2,6-diyl and 1,2,3,4-tetrahydronaphthaline-2,6-diyl, where the radicals (a) and (b) may be substituted by one or two fluorine atoms, $Z^3$ and $Z^4$ are each, independently of one another, —CO—O—, —O—CO—, —CH$_2$O—, —OCH$_2$—, —CH$_2$CH$_2$—, —CH=CH$_2$—C≡C—, or a single bond, or one of the radicals $Z^3$ and $Z^4$ is —(CH$_2$)$_4$— or —CH=CH—CH$_2$CH$_2$—, and n is 0, 1 or 2.

2. Display according to claim 1, characterized in that the medium comprises at least two compounds of formula Ia.

3. Display according to claim 1, characterized in that the medium comprises at least three compounds of formula Ia.

4. Display according to claim 1, characterized in that the medium comprises at least two compounds of formula Ib.

5. Display according to claim 1, characterized in that the medium comprises at least three compounds of formula Ib.

6. Display according to claim 2, characterized in that the medium comprises at least two compounds of formula Ib.

7. Display according to claim 3, characterized in that the medium comprises at least three compounds of formula Ib.

8. Display according to claim 1 characterized in that the medium contains at least one compound of formula Ia in which

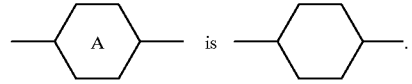

9. Display according to claim 1 characterized in that the medium contains at least one compound of formula Ia in which

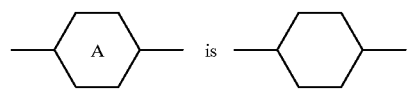

and at least one compound of the formula Ia in which

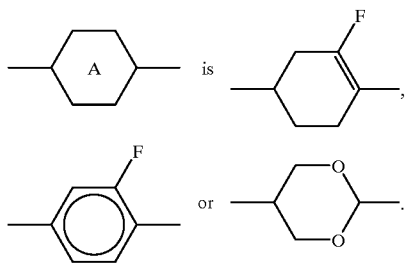

10. Display according to claim 1 characterized in that the medium contains at least one compound of formula Ib in which

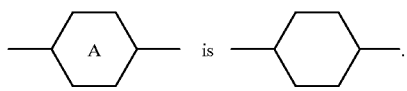

11. Display according to claim 9 characterized in that the medium contains at least one compound of formula Ib in which

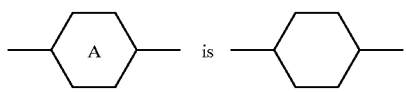

12. Liquid-crystal display according to claim 1, characterized in that the medium comprises at least one compound of the formula II in which $R^2$ $A^3$, $A^4$, $Z^3$, $Z^4$ and n are as defined above,
$L^3$ is F, and
$L^4$ is H or F.

13. Liquid-crystal display according to claim 1, characterized in that the medium comprises at least one compound selected from the formulae IIa to IIc

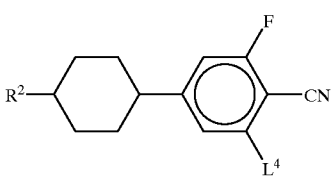
IIa

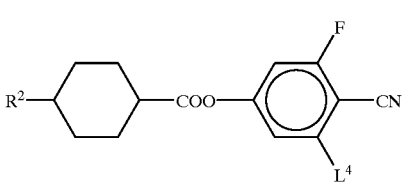
IIb

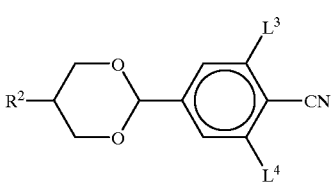
IIc in which $R^2$, $L^3$ and $L^4$ are in each case as defined claim 1.

14. Liquid-crystal display according to claim 1, characterized in that the medium has a dielectric anisotropy $\Delta\epsilon$ of >8.5.

15. Liquid-crystal display according to claim 1, characterized in that the medium comprises at least one compound of the formula III $$R^3-(A^5-Z^5)_o-A^6-R^4 \quad \text{III}$$

in which
$R^3$ and $R^4$ are each, independently of one another, as defined for $R^1$,
$A^5$ and $A^6$ are each, independently of one another, as defined for $A^3$ and $A^4$,
$Z^5$ is in each case, independently of the others, as defined for $Z^3$ and $Z^4$, and
o is 1, 2 or 3.

16. Liquid-crystal display according to claim 1, characterized in that the medium comprises at least one compound of the formula IV

IV in which
$R^5$ is as defined for $R^1$,
$A^7$ and $A^8$ are each, independently of one another, as defined for $A^3$ and $A^4$,
$Z^7$ and $Z^8$ are each, independently of one another, as defined for $Z^3$ and $Z^4$,
$L^5$ and $L^6$ are each, independently of one another, H or F,
Q is a polyfluoroalkylene radical of the formula

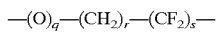

in which
q is 0 or 1
r is 0 or an integer between 1 and 6 and
s is an integer between 1 and 6,
x is H, F or Cl, and
p is 0, 1 or 2.

17. Display according to claim 1, characterized in that the pixels within the display are addressed by means of an active matrix.

18. Liquid crystalline medium of positive dielectric anisotropy, characterized in that the medium comprises at least one compound of the formula Ia

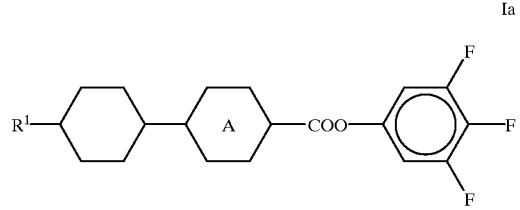
Ia and at least one compound of formula Ib

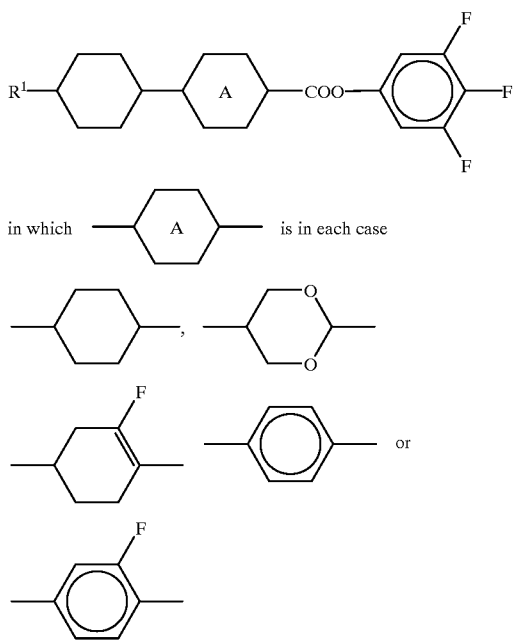

and
R¹ is H, an alkyl or alkenyl radical having 1 to 15 carbon atoms which is unsubstituted, monosubstituted by CN or CF₃ or at least monosubstituted by halogen, where one or more CH₂ groups in these radicals may also, in each case independently of one another, be replaced by —O—, —S—, —CO—, —CO—O—, —O—CO— or —O—CO— in such a way, that O-atoms are nor linked directly to one another, and at lease one compound of formula II

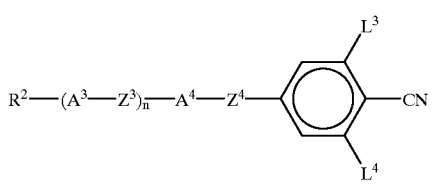

in which
L³ and L⁴ are each H or F,
R² is as defined for R¹, and
A³ and A⁴ are each, independently of one another, a
  a) trans-1,4-cyclohexylene radical or 1,4-cyclohexenylene radical, in which, in addition, one or more non-adjacent CH₂ groups may be replaced by —O— and/or —S—,
  b) 1,4-phenylene radical, in which, in addition, one or two CH groups may be replaced by N,
  c) radical from the group consisting of 1,4-dicyclo(2,2,2)octylene, piperidine-1,4-diyl, naphthaline-2,6-diyl, decahydronaphthaline-2,6-diyl and 1,2,3,4-Tetrahydronaphthaline-2,6-diyl,
where the radicals (a) and (b) may be substituted by one or two fluorine atoms,
Z³ and Z⁴ are each, independently of one another, —CO—O—, —O—CO—, —CH₂O—, —OCH2—, —CH₂CH₂—, —CH═CH, —C≡C—, or a single bond, or one of the radicals Z³ and Z⁴ is —(CH₂)₄— or —CH═CH—CH₂CH₂—, and
n is 0, 1 or 2.

19. A liquid crystalline medium according to claim 18, characterized in that the medium comprises at least two compounds of formula Ia.

20. A liquid crystalline medium according to claim 18, characterized in that the medium comprises at least three compounds of formula Ia.

21. A liquid crystalline medium according to claim 18, characterized in that the medium comprises at least two compounds of formula Ib.

22. A liquid crystalline medium according to claim 18, characterized in that the medium comprises at least three compounds of formula Ib.

23. A liquid crystalline medium according to claim 18 characterized in that the medium contains at least one compound of formula Ia in which

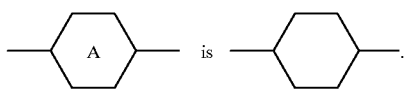

24. A liquid crystalline medium according to claim 18 characterized in that the medium contains at least one compound of formula Ia in which

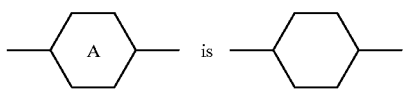

and at least one compound of the formula Ia in which

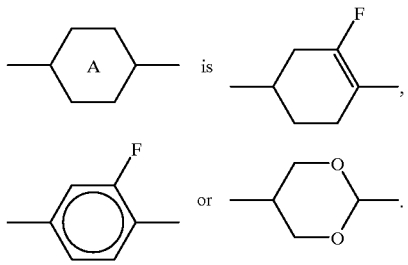

25. A liquid crystalline medium according to claim 18 characterized in that the medium contains at least one compound of formula Ib in which

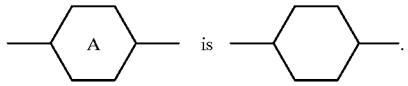

26. A liquid crystalline medium according to claim 18, characterized in that the medium comprises at least one compound of the formula II in which R², A³, A⁴, Z³, Z⁴ and n are as defined in claim 18,
L³ is F, and
L⁴ is H or F.

27. A liquid crystalline medium according to claim 18, characterized in that the medium comprises at least one compound selected from the formulae IIa to IIc

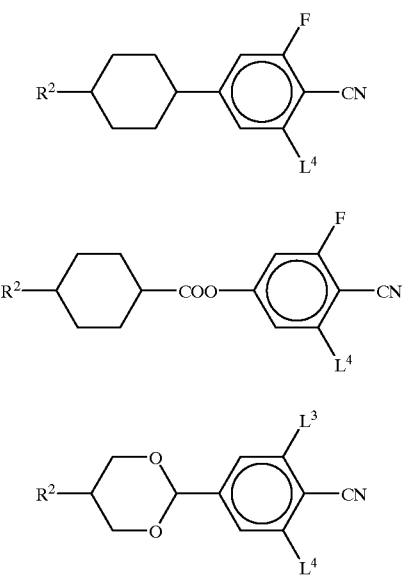

in which $R^2$, $L^3$ and $L^4$ are in each case as defined in claim 18.

28. A liquid crystalline medium according to claim 18 having a dielectric anisotropy Δε of >8.5.

29. A liquid crystalline medium according to claim 18 comprising at least one compound of the formula III

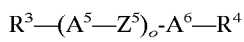

in which

R³ and R⁴ are each, independently of one another as defined for R¹,

A⁵ and A⁶ are each, independently of one another, as defined for A³ and A⁴,

Z⁵ is in each case, independently of the others, as defined for Z³ and Z⁴, and o is 1, 2 or 3.

30. A liquid crystalline medium according to claim 18, characterized in that the medium comprises at least one compound of the formula IV

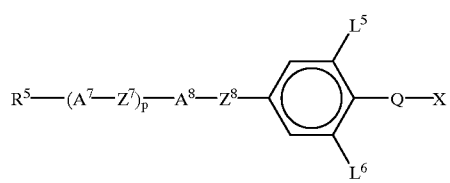

in which

R⁵ is as defined for R¹,

A⁷ and A⁸ are each, independently of one another, as defined for A³ and A⁴,

Z⁷ and Z⁸ are each, independently of one another, as defined for Z³ and Z⁴,

L³ and L⁶ are each, independently of one another, H or F,

Q is a polyfluoroalkylene radical of the formula $$-(O)_q-(CH_2)_r-(CF_2)_s-$$

in which q is 0 or 1 r is 0 or an integer between 1 and 6 and s is an integer between 1 and 6,

X is H, F or Cl, and

P is 0, 1 or 2.

31. A liquid crystalline medium characterized in that it comprises from 10 to 60% by weight, of at least one compound of the formula I,

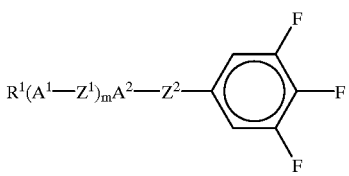

from 15 to 40% by weight, of at least one compound of the formula II of claim 18, from 20 to 55% by weight, of at least one compound of the formula (III),

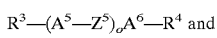 and from 0 to 30% by weight, of a compound of formula IV

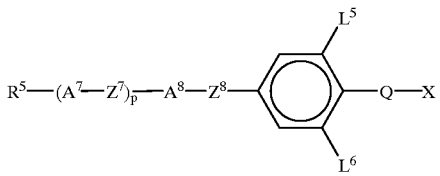

wherein R¹ is as defined in claim 18.

A¹ and A² are each, independently of one another, a
(a) trans-1,4-cyclohexylene radical or 1,4-cyclohexenylene radical, in which, in addition, one or more non-adjacent CH₂ groups may be replaced by —O— and/or —S—,
(b) 1,4-phenylene radical, in which, in addition, one or two CH groups may be replaced by N,
(c) radical from the group consisting of 1,4-dicyclo(2,2,2)octylene, piperidine-1,4-diyl, naphthalene-2,6-diyl, decahydronaphthalene2,6-diyl and 1,2,3,4-tetrahydronaphthalene-2,6-diyl, where the radicals (a) and (b) may be substituted by one or two fluorine atoms, Z¹ and Z² are each, independently of one another, —CO—O—, —O—CO—, —CH₂O—, —OCH₂—, —CH₂CH₂—, —CH=CH—, —C≡C—, or a single bond, or one of the radicals Z1 and Z2 is —(CH₂)4— or —CH=CH—CH₂CH₂—, and m is 0, 1 or 2;

R⁵ is as defined for R¹,

A⁷ and A⁸ are each, independently of one another, as defined for A¹ and A²,

Z⁷ and Z⁸ are each, independently of one another, as defined for Z¹ and Z², $L^5$ and $L^6$ are each, independently of one another, H or F, Q is a polyfluoroalkylene radical of the formula —$(O)_q$—$(CH_2)_r$—$(CF_2)_s$— in which q is 0 or 1
r is 0 or an integer between 1 and 6 and
s is an integer between 1 and 6, X is H, F or Cl, and p is 0, 1 or 2.

$R^3$ and $R^4$ are each, independently of one another, as defined for $R^1$, $A^5$ and $A^6$ are each, independently of one another, as defined for $A^1$ and $A^2$, o is 1, 2 or 3.

32. A liquid crystalline medium of claim 31 which comprises

15–40% by weight of at least one compound of formula I,

20–35% by weight of at least one compound of formula II,

35–50% by weight of at least one compound of formula III and

20–25% by weight of at least one compound of formula IV.

33. Liquid-crystalline medium according to claim 32, characterized in that it comprises:

at least one compound selected from each of formulae Ia and Ib

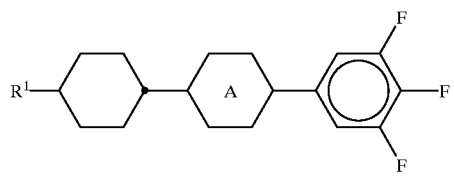

Ia

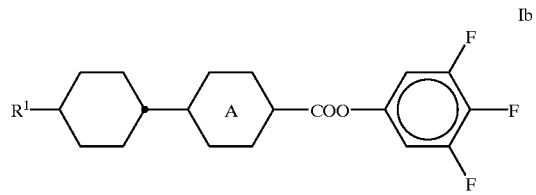

Ib at least one compound selected from the formulae II1, II2, II3 and II4,

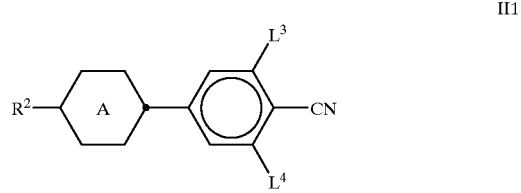

II1

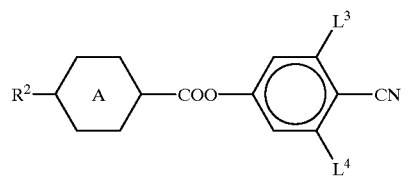

II2

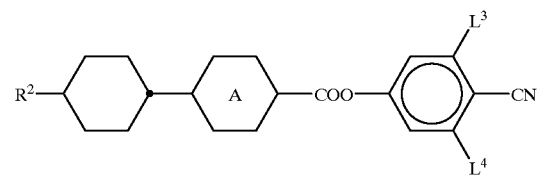

II3

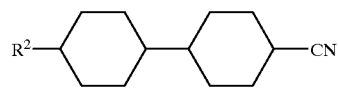

II4 at least one compound selected from the formulae IIIa, IIIb and IIIc,

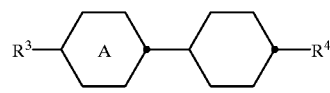

IIIa

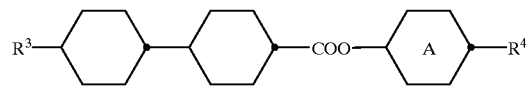

IIIb

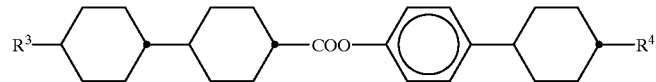

IIIc and optionally at least one compound selected from the formulae IVa and IVb,

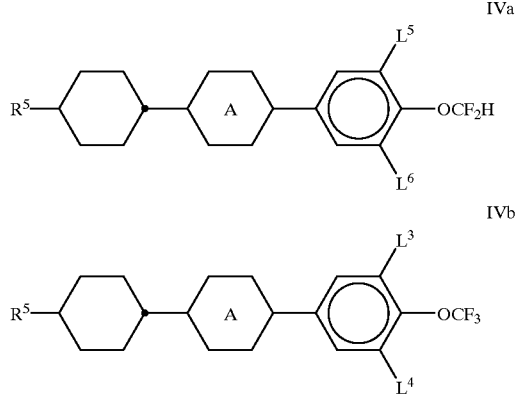
IVa
IVb
in which
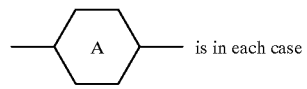 is in each case
-continued
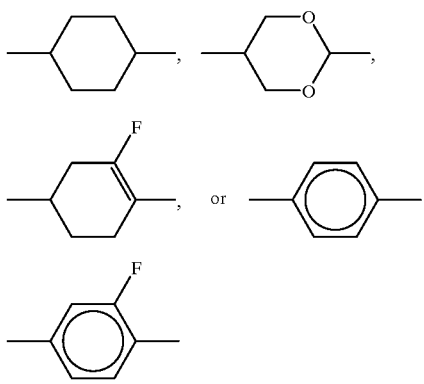
and $R^1$, $R^2$, $R^3$, $R^4$, $R^5$, $L^1$, $L^2$, $L^3$, $L^4$, $L^5$ and $L^6$ are each as defined above.
* * * * *